US006897802B1

(12) United States Patent
Daniell et al.

(10) Patent No.: US 6,897,802 B1
(45) Date of Patent: May 24, 2005

(54) FUSION OF SHAPE AND MULTISCALE FEATURES FOR UNKNOWN TARGET REJECTION

(75) Inventors: Cynthia Daniell, Pasadena, CA (US); Narayan Srinivasa, Thousand Oaks, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/704,841

(22) Filed: Nov. 10, 2003

(51) Int. Cl.$^7$ ................................................. G01S 7/41
(52) U.S. Cl. ..................... 342/90; 342/25 A; 342/91; 342/176; 342/179; 342/195; 342/25 F
(58) Field of Search ............................. 342/90, 93, 91, 342/89, 25 A, 25 F, 195, 191, 190, 179, 176, 175

(56) References Cited

U.S. PATENT DOCUMENTS

| | | | | | |
|---|---|---|---|---|---|
| 4,768,156 | A | * | 8/1988 | Whitehouse et al. | ........ 382/279 |
| 4,965,582 | A | * | 10/1990 | Hellsten | ...................... 342/25 |
| 5,717,401 | A | * | 2/1998 | Sabet-Peyman et al. | ..... 342/192 |
| 6,259,396 | B1 | * | 7/2001 | Pham et al. | ................... 342/90 |
| 6,424,737 | B1 | * | 7/2002 | Rising, III | ................... 382/156 |
| 6,717,545 | B2 | * | 4/2004 | Dizaji et al. | ................... 342/93 |

OTHER PUBLICATIONS

"Radar permanent scatterers identification in urban areas: target characterization and sub–pixel analysis", Ferretti, A.; Colesant C.; Prati, C.; Rocca, F.; Remote Sensing and Data Fusion over Urban Areas, IEEE/ISPRS Joint Workshop, Nov. 8–9, 2001 Ps:5.*

"Multi–sensor 3D image fusion and interactive search", Ross, W.D et al;Information FUSION, 2000. Fusion 2000. Proceedings Ps:TUC3/10—TUC3/17.*

"Application of pixel segmentation to the low rate compression of complex SAR imagery", Ives, R.W.; Eichel, P.; Magotra, N.; IGARSS '98, vo.l: 2, Jul. 6–10, 1998 Ps:1064—1067.*

* cited by examiner

Primary Examiner—John B. Sotomayor
(74) Attorney, Agent, or Firm—Leonard A. Alkov; Karl A. Vick

(57) ABSTRACT

A plurality of image chips (202) (over 100), each of the chips containing the same, known target of interest, such as, for example an M109 tank are presented to the system for training. Each image chip of the known target is slightly different than the next, showing the known target at different aspect angles and rotation with respect to the moving platform acquiring the image chip.

The system extract multiple features of the known target from the plurality of image chips (202) presented for storage and analysis, or training. These features distinguish a known target of interest from the nearest similar target to the M109 tank, for example a Caterpillar D7 bulldozer. These features are stored for use during unknown target identification. When an unknown target chip is presented, the recognition algorithm relies on the features stored during training to attempt to identify the target.

The tools used for extracting features of the known target of interest as well as the unknown target presented for identification are the same and include the Haar Transform (404), and entropy measurements (410) generating coefficient locations. Using the Karhunen-Loeve (KL) transform 406, eigenvectors are computed. A Gaussian mixture model (GMM) (507) is used to compare the extracted coefficients and eigenfeatures from the known target chips with that of the unknown target chips. Thus the system is trained initially by presenting to it known target chips for classification. Subsequently, the system uses the training in the form of stored eigenfeatures and entropy coefficients fused with multiscale features to identify unknown targets.

24 Claims, 6 Drawing Sheets

FUSION OF SHAPE AND MULTISCALE FEATURES FOR UNKNOWN TARGET REJECTION

BACKGROUND OF THE INVENTION

1. Field of Invention

This invention is in the field of automatic target recognition applied to a radar image.

2. Description of the Related Art

An important function of a radar system, whether a Real Beam type, Synthetic Aperture (SAR) or Interferometric SAR is to detect a target as well as identify it. Radar target detection and identification have been proven necessary in military surveillance, reconnaissance, and combat missions. The detection and identification of targets provide real-time assessment of the number and the locations of targets of interest.

One method of target detection and identification is to process the image acquired by the radar using, for example, Synthetic Aperture Radar (SAR) technology. By processing a SAR generated image, the features of a target can be extracted and matched to a database for identification.

The general principle behind SAR is to obtain high resolution images by coherently combining the amplitude and phase information of separate radar returns from a plurality of sequentially transmitted pulses from a relatively small antenna on a moving platform. The returns from the plurality of pulses transmitted during a SAR image, when coherently combined and processed, result in image quality comparable to a longer antenna, corresponding approximately to the synthetic "length" traveled by the antenna during the acquisition of the image.

High resolution SAR maps are obtained by coherently combining return signals reflected from transmitted pulses in the cross range direction from radar platform movement. However, formation of focused SAR images or maps requires accurate information on platform position and velocity to shift and focus the received radar returns over the duration of the image acquisition time, the array length, so as to have a useful, phase adjusted combination of pulse returns from multiple pulses transmitted at different times from different radar positions. The process of aligning pulses in time and space for coherent integration is referred to as motion compensation, and is usually performed with the raw radar data, at the early stage of the image formation process.

The plurality of returns forming the image generated by the transmitted pulses along a known path of the platform make up an array length. During the array length, amplitude as well as phase information (in phase (I) and quadrature(Q) components) returned from reception of returns from each transmitted pulse, for each of many range bins, is preserved. The SAR image is formed and focused from the coherent combination of the amplitude and phase of return(s) within each range bin, motion compensated (phase adjusted) for spatial displacement of the moving platform during the acquisition of the returns for the duration of the array length.

One aspect of achieving coherent integration of pulses into one SAR image is the need for some form of inertial navigation/ground positioning satellite system (INS/GPS) to indicate the spatial and time coordinates of each transmitted and received (or reflected) pulse. These time and space coordinates of radar returns need to be known to a relatively high accuracy, typically in fractions of a wavelength, to arrive at a clear, focused, un-smeared image. Sometimes the alignment of pulses using the INS/CPS is imperfect, especially towards the edge of the image, introducing "snow" or a grainy character into the SAR image, making it difficult to discern target outline from its background.

It is this grainy character that tends to obfuscate a SAR image thus requiring robust algorithms to extract a target from the SAR image as well as identifying it. The radar image varies from radar to radar depending on the accuracy of the particular INS/CPS, the position of the target within the imaging area, instantaneous operating frequency, as well as glint/fading and target fluctuations. Thus, unlike photographic images, target detection and identification requires a robust approach capable of compensating for characteristics specific to a particular radar system, its operation and type of target being imaged and identified.

Attempts have been made towards target identification extracted from radar images. For example, U.S. Pat. No. 6,295,373 to Abhijit Mahalanobis et al, incorporated herein in its entirety, including all references, describes a method and apparatus for detecting a pattern within an image. Similarly, U.S. Pat. No. 5,947,413, also incorporated herein in its entirety, including references, uses correlation filters for target re-acquisition in trackers.

Another example, J. Wissinger, et. al., in *MSTAR's Extensible Search Engine and Model-Based Inferencing Toolkit*, SPIE 13th Annual International Symposium on AeroSene, Algorithms for SAR Imagery VI, incorporated herein in its entirety, including all references, rely on models to implement an algorithm for target identification. During operation, all targets under consideration are forced into one of the known target classes. There is no mechanism to adapt for an unknown target. Thus a high false alarm rate is encountered.

Similarly, J. De Bonet, P. Viola, and J. Fisher, in *Flexible Histograms: A Multiresolution Target Discrimination Model SPIE Proceedings*, 1998, rely only on multiscale features of targets. Again, this yields a relatively high false alarm rate.

Because of above limitations of the prior art, high false alarm rates are encountered, limiting the utility of an imaging and target detection radar.

SUMMARY OF THE INVENTION

The present invention avoids the limitations of the prior art by presenting for storage and analysis a plurality of image chips 202 (over 100), each of the chips containing the same, known target of interest, such as, for example an M109 tank. Each image chip of the known target is slightly different than the next, showing the known target at different aspect angles and rotation with respect to the moving platform acquiring the image chip.

The system extract multiple features of the known target from the plurality of image chips 202 presented for storage and analysis, or training. These features distinguish a known target of interest from the nearest similar target to the M109 tank, for example a Caterpillar D7 bulldozer. These features are stored for use during unknown target identification. When an unknown target chip is presented, the recognition algorithm relies on the features stored during training to attempt to identify the target.

The tools used for extracting features of the known target of interest as well as the unknown target presented for identification are the same and include the Haar Transform 404, and entropy measurements 410 generating coefficient locations. Using the Karhunen-Loeve (KL) transform 406, eigenvectors are computed. A Gaussian mixture model (GMM) 507 is used to compare the extracted coefficients and eigen-features from the known target chips with that of the unknown target chips. Thus the system is trained initially by presenting to it known target chips for classification. Subsequently, the system uses the training in the form of stored eigenfeatures and entropy coefficients fused with multiscale features to identify unknown targets.

DETAILED DESCRIPTION

Figure 2:
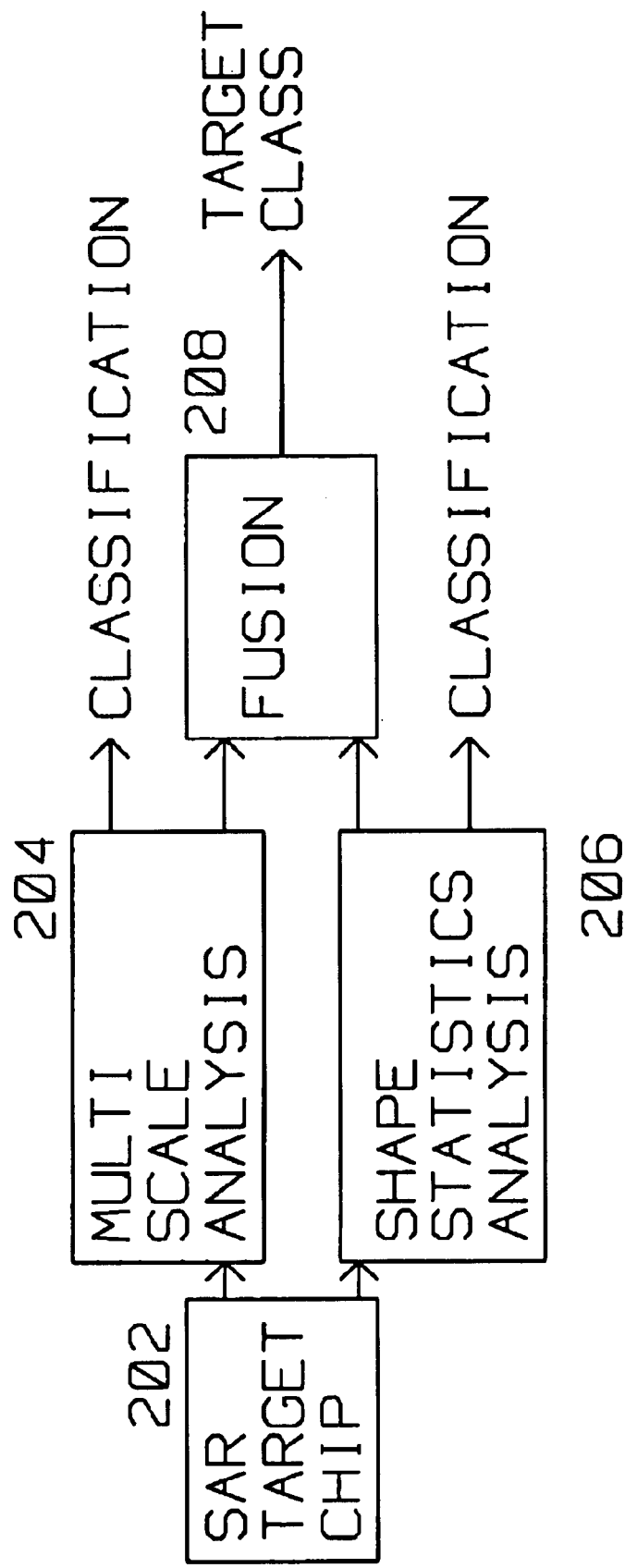
FIG. 2 is an exemplary configuration of this invention where two complementary analyses are performed to arrive at a target classification.

The present invention describes an apparatus and method of target identification problem using two complementary recognition algorithms operating in parallel with subsequent fusion of results to produce a final classification, as shown in FIG. 2. The first recognition algorithm is based on a multiscale analysis, while the second uses shape statistics analysis. They complement each other well because the multiscale approach does not rely on segmentation of the target from the background, but is not invariant to scale, translation, or rotation. In contrast, the shape statistics approach is completely invariant to scale, translation, and rotation. However, shape statistics analysis relies on good quality segmentation of the target from the background.

Another aspect of the invention is that it can adapt to specific characteristics of a target, that is it can be "trained" from the examination of radar returns acquired for a particular target (image chips) acquired at different times with separate radar systems. These specific characteristics for the particular target are expressed as eigenvectors that are considered and updated every time a particular target is presented.

Figure 1:
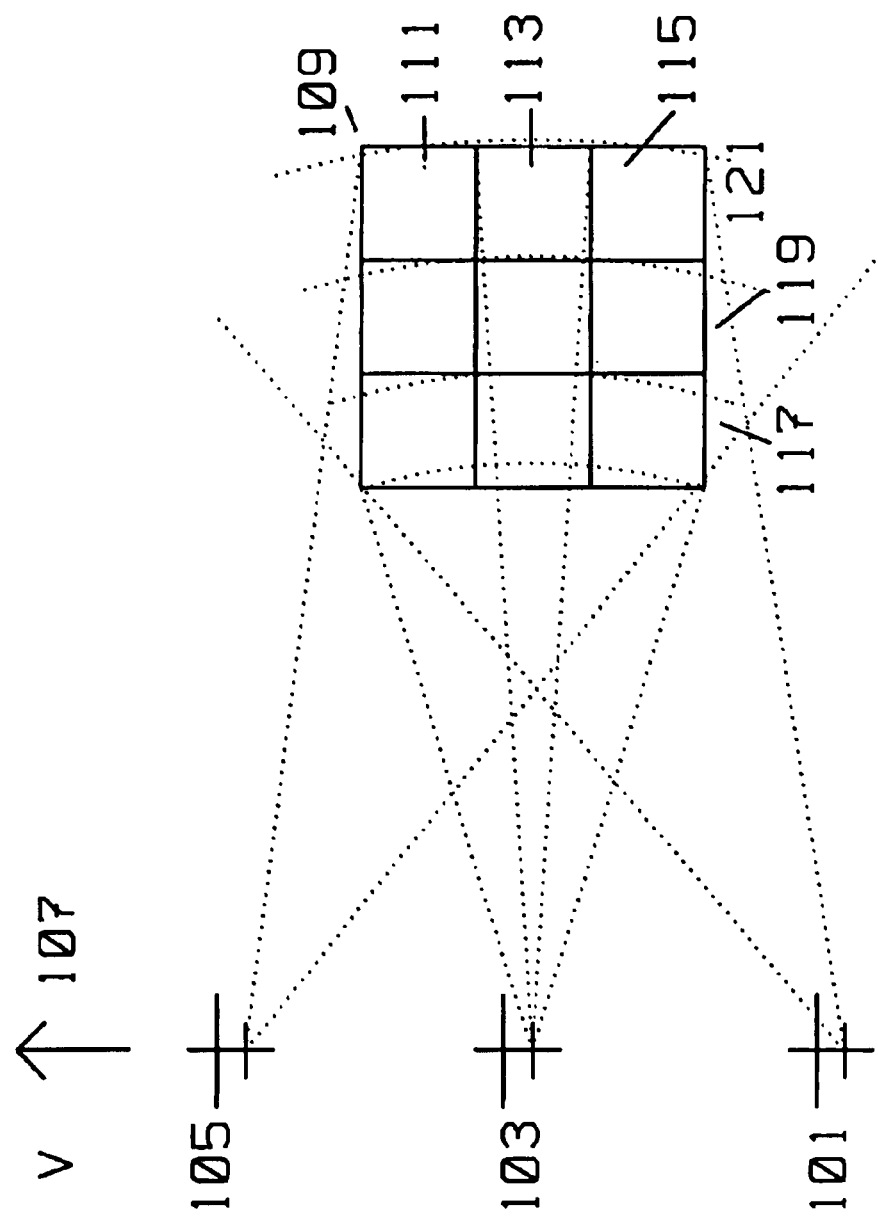
FIG. 1 is a sample configuration of the prior art showing the acquisition of a radar image containing a target using SAR methods.

FIG. 1, the prior art, shows a simplified, typical geometric relationship between a moving platform carrying a radar transmitter/receiver using Synthetic Aperture (SAR) methods and target area 109 to be imaged by said radar transmitter/receiver. The moving platform is initially at position 101, travels with velocity V in the direction 107. The moving platform moves from position 101 to position 103, and then to position 105 along a path in direction 107. Imaging pulses are transmitted and received at each position 101, position 103 and position 105. At position 103 for example, the target area 109 to be imaged falls within range bins 117, 119, and 121. In azimuth, target area 109 falls within azimuth positions 111, 113 and 115. The range bin/azimuth positions at this position 103 are most favorable as they most closely correspond to the square nature of target area 109 and subdivisions thereof. The simple example of a 3 by 3 matrix of range bins/azimuth positions is illustrative of the raw data used by the present invention for target acquisition and identification using SAR methods. Typically, a target is contained within a plurality of range bins/azimuth positions, where the plurality of range bins/azimuth positions are part of a larger image rendered by the radar system.

In FIG. 2, target chip 202 has been extracted from the radar image generated with a SAR system shown in FIG. 1. The target chip contains the target of interest. Radar pre-processing extracts only the target itself and its shadow to be present within the image chip. The target is rotated to the horizon line given the pose estimate. During field operation the pose estimate comes from the target detection function of the radar system. Radar pre-processing is detailed in FIG. 3.

Multiscale analysis 204 is performed on the target chip to generate a first classification. Shape statistics analysis 206 is also performed on the same target chip 202 to generate a second classification. The first and second classification, the results from multiscale analysis 204 and shape statistics analysis 206 are combined in fusion 208, generating a target classification from the results derived from both methods of analysis.

Multiscale analysis 204

Figure 3:
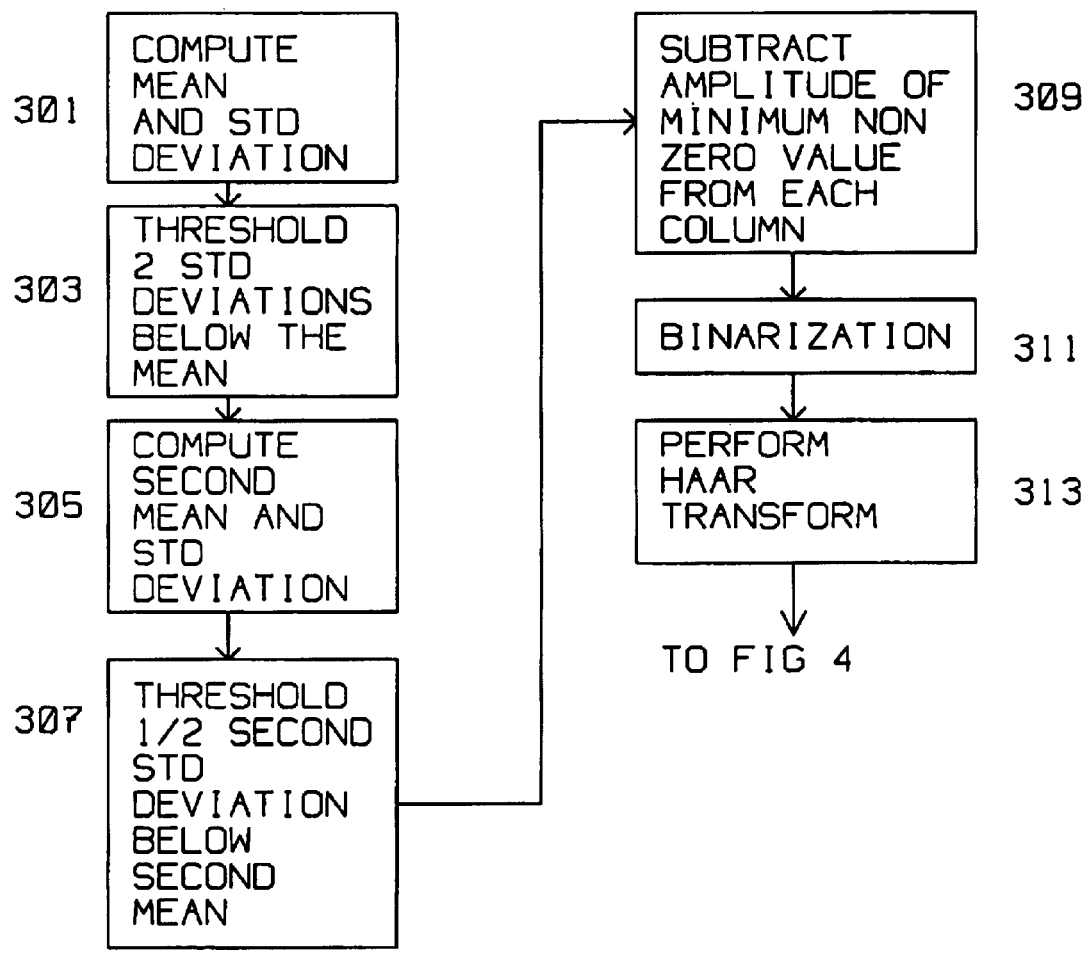
FIG. 3 shows the pre-processing required for applying the two complementary analyses to an image chip.

The multiscale analysis 204 uses a statistical pre-processor performing the following steps, using the detection angle supplied by the radar, and shown in FIG. 3:

a) Compute the mean and standard deviation 301 for the image chip containing the target using the amplitudes of each image element (pixel or range/azimuth bin or increment) available from the radar system for the image chip.

b) Set a first threshold two standard deviations below the mean 303 of the image chip.

c) Reject all image elements below said first threshold to create a first thresholded image chip, i.e. comparing each image element in the image chip to a value two standard deviations below the mean, the first threshold, and setting to zero all image elements below said first threshold.

d) Compute a second mean and second standard deviation 305 for said first thresholded chip.

e) Set a second threshold 307, said second threshold one-half of a second standard deviation above the second mean.

f) Reject all image elements below said second threshold to generate a second thresholded chip.

g) Subtract the amplitude of the minimum non-zero value from each column in the second thresholded chip 309. That is, determining the minimum non-zero value in each column of the second thresholded chip, and subtracting its amplitude from the amplitudes of all non-zero values within the particular column of the second thresholded chip to generate a third image chip.

h) Perform a binarization 311 of the third image chip using morphological filtering of holes and single pixel noise, further eliminating extraneous information, thus obtaining a fourth image chip.

i) Retain amplitude (gray level) values from the fourth image chip under the binary region determined in (h) above.

Perform a Haar transform decomposition 313 applied to the fourth image chip. The multiresolution representation defines a spatial frequency response at several different scales. Three scales are used in the best mode of this invention. This facilitates efficient computation because of the down sampling occurring at every level. The Haar transform is further detailed by Haar, A. in *Zur Theorie der Orthogonalen Funktionensysteme*. Math. Ann. 69, 331–371, 1910.

Adaptive function—Training and testing

Another aspect of the present invention is its adaptive capability to learn from a plurality of images of the same subject, such as for example an M109 tank, presented to it for training.

Figure 4:
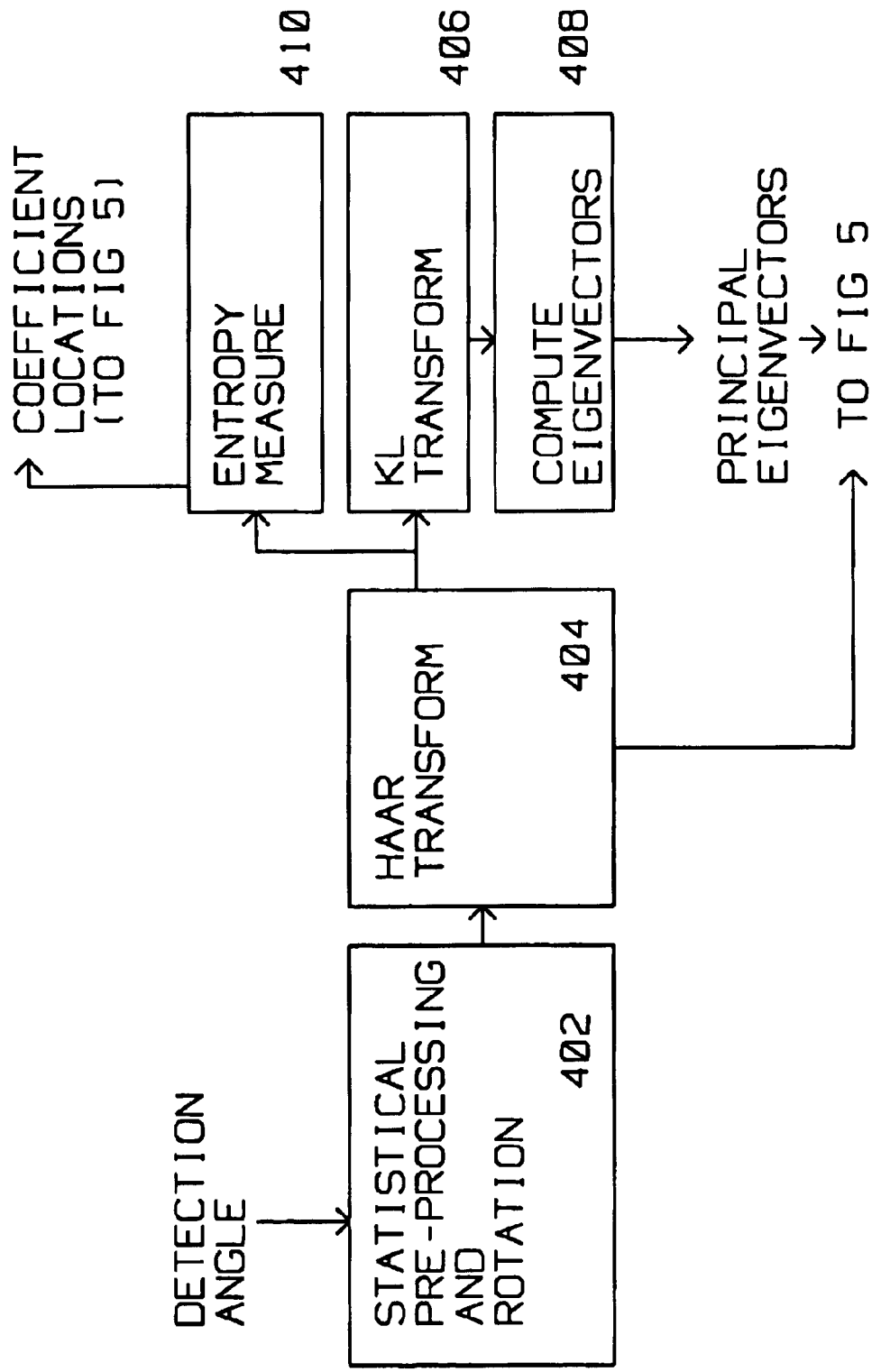
FIG. 4 is an exemplary implementation of extracting entropy and eigenvector computations for an incoming image chip having known characteristics.
Figure 5:
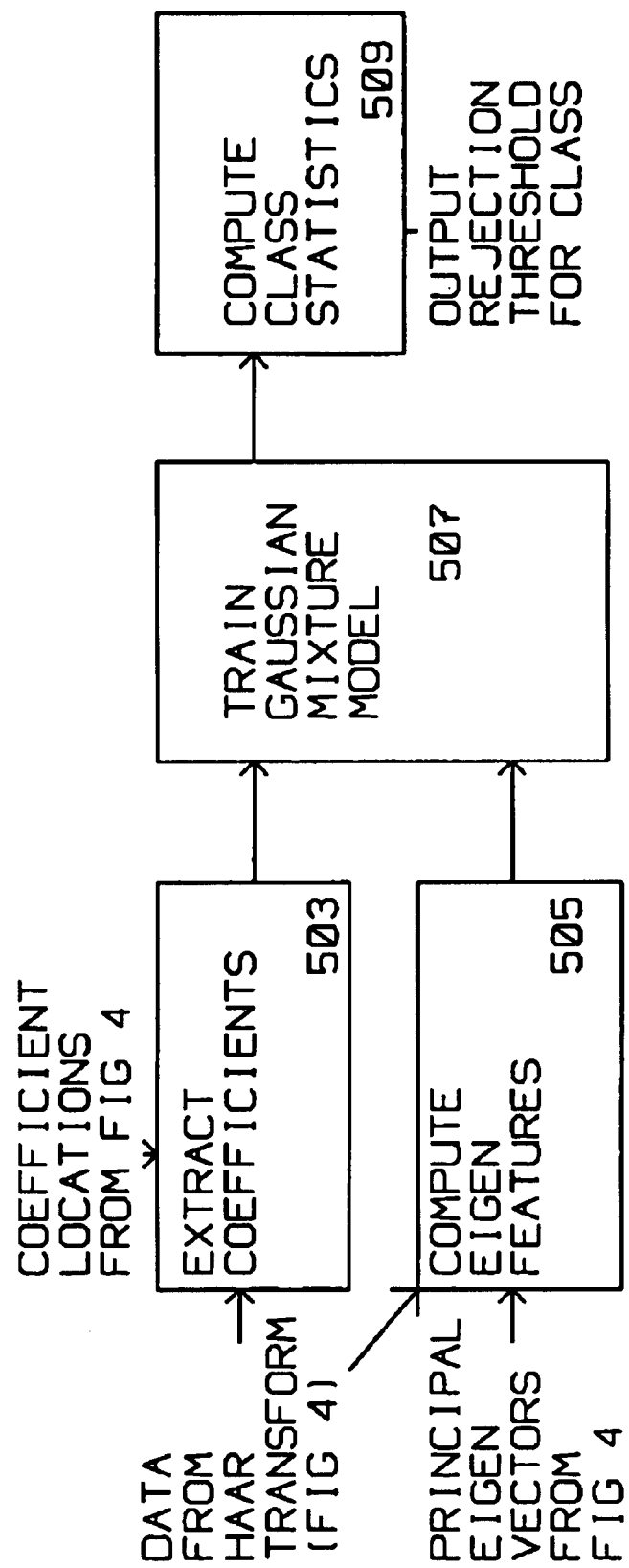
FIG. 5 is an exemplary implementation of the use of eigenvectors and other coefficients to train a Gaussian Mixture Model to identify an unknown target.

As shown in FIG. 4, after statistical preprocessing of the SAR image, extracting the image chip containing the target, and considering the detection angle of the target 402, the target information is passed to the Haar transform 404. Following the Haar transform results, the present method splits into two distinct phases: training and testing. The training phase is also split into two phases as shown in FIG. 4 and FIG. 5. During the training phase, shown in FIG. 4, a set of image chips, typically 180 or more, depicting a target of interest, such as an M109 tank, acquired under different conditions (such as different target orientations), with different SAR radars is used. This collection of image chips of the same target rendered by radar under differing circumstances provides a cross section of "typical" signatures for that particular target.

A part of the training phase is the feature selection which utilizes information theoretic measures for optimum features. Entropy measure 410 relay the level of uncertainty about a variable. Thus, another step is to calculate the entropy of the coefficients in the wavelet decomposition over all training samples. Select the coefficient positions with the lowest entropy, making sure to select some coefficients from each subband including the low frequency subbands on level one and two. Furthermore, compute the eigenvectors 408 from the frequency subbands on each level, after summing up the energy of the corresponding eigenvalues until it reaches 99 of the total. These are the significant eigenvalues. Next, store all of the corresponding significant eigenvectors for use during the training of the Gaussian Mixture Model (GMM)507 in FIG. 5 as well as during the testing phase.

After finding the coefficient locations and significant eigenvectors, proceed to the second half of the training phase in FIG. 5. Process all of the training image chips showing a particular target, such as, for example, an M 109 tank, again extracting features (coefficients) 503 for each one. The entropy features come from the coefficient locations selected earlier by 410. Compute eigenfeatures 505 multiplies the selected eigenvectors by the appropriate subband from the individual training example. This process produces one value for each eigenvector. It is similar to a procedure known as eigenfaces. Typically 45 entropy features and 71 eigenfeatures are generated for each training example, such as the M109 tank.

The Gaussian Mixture Model 507 trains itself using these 116 features from the 120 examples used for example in the M109 tank training set, typical for this type of target. This results in a prototypical feature, which is the mean of the m109 tank cluster. Compute class statistics 509 computes the standard deviation of the cluster for use later as a rejection threshold.

The following steps are performed during testing, that is identifying a known target within a radar image, such as for example an image chip of the M109 tank:

a) Preprocess the image chip, b) Compute the Haar transform, c) extract the entropy features from the stored coefficient locations, d) compute the eigenfeatures, e) append the entropy features and eigenfeatures, compute their distance from the standard, known, prototype image of an M109 tank, using the GMM and threshold the result.

f) If the distance is within a distance threshold, classify the input as an M109 tank. (An input with a distance greater than the threshold is rejected as not an M109 tank.)

The threshold at the output of the GMM dictates the operating point on the Receiver Operator Curve.

Shape Statistics Analysis

Figure 6:
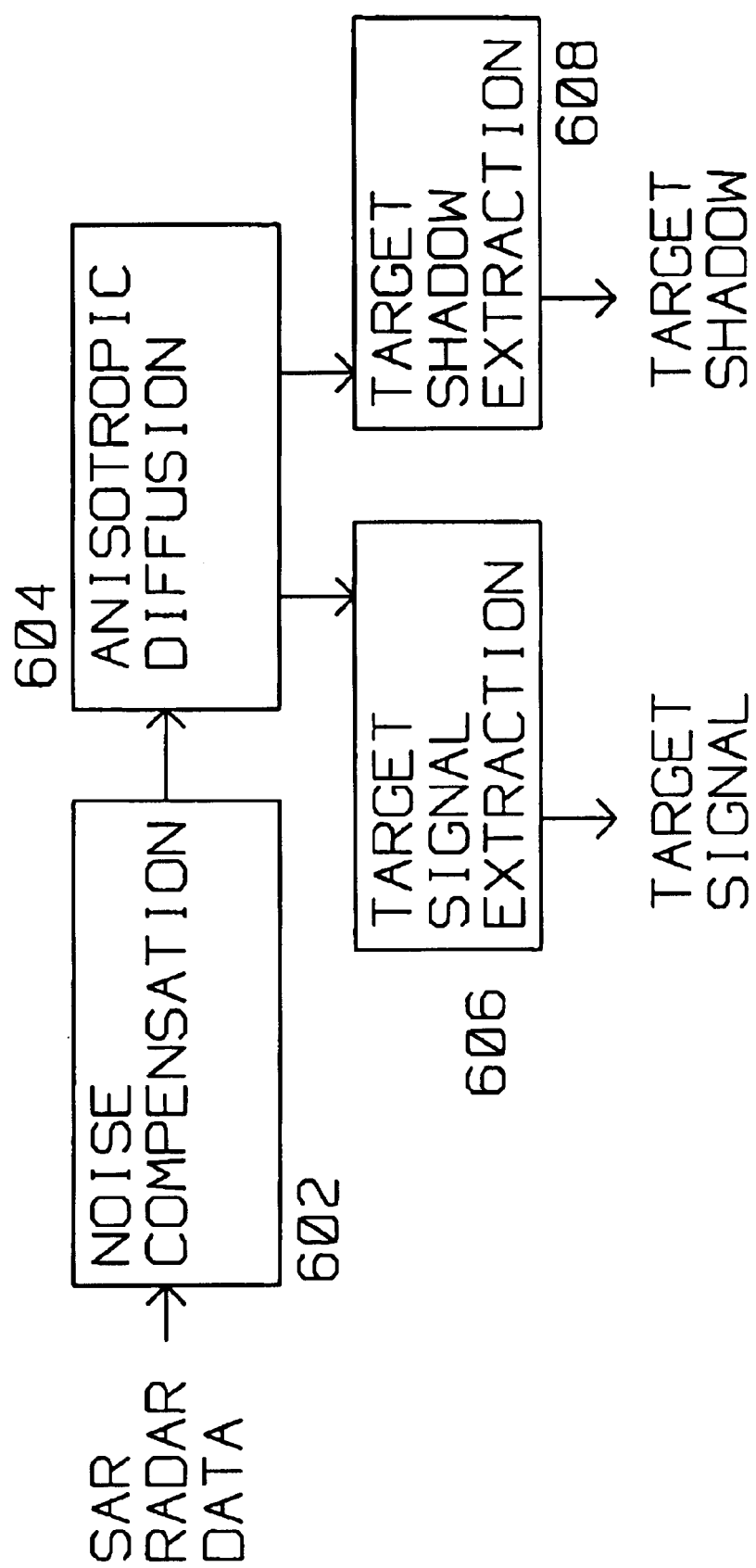
FIG. 6 is an exemplary implementation of preprocessing to be used with one of the complementary analyses requiring high quality segmentation.

The components of the shape statistics analysis are shown in FIG. 5. High quality segmentation is important for robust shape features, thus, use the preprocessing system shown in FIG. 6.

Noise compensation 602 uses a multiscale approach across six scales and six orientations. The expected value of the energy due to noise is estimated from the smallest scale filter. A noise threshold is then set three standard deviations above the mean. Next, anisotropic diffusion 604 boosts the signal and isolates it from the background. This technique uses diffusion to spread across low frequency content and inhibition to create bounds at the high frequency content (contrast/edges). Finally, incremental binary thresholding followed by size filtering and directional edge linking complete the extraction of any distinct areas within the image chip. The preprocessing is able to extract both the target, using target signal extraction 606 and the shadow of the target, using target shadow extraction 608.

Extract shape signatures of objects using a probability distribution sampled from a shape function measuring geometric properties of the object under consideration. This method is for extracting the overall shape of a given class of objects. The shape function used is the Euclidian distance measure between pairs of randomly selected points around the object's perimeter. This shape function yields invariance under rigid motions and mirror imaging. Invariance to scaling is added by normalization of shape distributions before comparing them and/or by factoring out scale during the comparison. Random sampling of the perimeter also ensures that the shape distributions are insensitive to small perturbations. This property essentially provides insensitivity to noise, blur, cracks and dust. The distance measures are then placed into a histogram and the object's shape signature is represented by the vertices of the histogram (distance vs. probability of that distance for the object).

The histograms comprise the shape feature vector which is then classified with a model based on Adaptive Resonance Theory (ART). Histograms were constructed for both the target's signal and shadow and then appended prior to the ART-based classifier. ART must undergo training with, for example the M109 tank radar data prior to its use in the testing operation.

Fusion 208

Following both the multiscale and shape statistics algorithm, fusion is used to improve performance. Fusion is at the feature level by appending the two sets of features to create a feature vector of, for example, 148 values. The GMM was is used to classify the test data using this conglomerate 148 value feature vector.

Therefore, the learning/testing sequence is as follows:

1) Present for storage and analysis a plurality of image chips (over 100) each of the containing the same, known target of interest, such as, for example the M109 tank. Each image chip is slightly different than the next, showing the known target at different aspect angles and rotation with respect to the moving platform acquiring the image chip.

2) Extract from the plurality of image chips presented for training multiple features of a known target of interest that distinguish it from the nearest similar target, for example a bulldozer. Store these features for use during unknown target identification.

3) When an unknown target chip is presented, the recognition algorithm relies on the features stored in 2 to attempt to identify the target.

The tools used for extracting features of the known target of interest as well as the unknown target presented for identification are the same and include entropy measurements 410 generating coefficient locations, and using the Karhunen-Loeve (KL) transform, computing eigenvectors. The KL transform is well known, and is described, for example, in *Applications of Digital Signal Processing*, by Oppenheim A. V., 1978, Prentice Hall, Inc. A Gaussian mixture model (GMM) is used to compare the extracted coefficients and eigenfeatures from the known target chips with that of the unknown target chips. Thus the system is trained initially by presenting to it known target chips for classification. Subsequently, the system uses the training in the form of stored eigenfeatures and entropy coefficients to identify unknown targets.

All references cited in this document are incorporated herein by reference in their entirety, including all references contained therein.

Although presented in exemplary fashion employing specific embodiments, the disclosed structures are not intended to be so limited. For example, the concept described herein is applicable to radar as well as sonar imaging and seismic processing.

Those skilled in the art will also appreciate that numerous changes and modifications could be made to the embodiment described herein without departing in any way from the invention. For example, other pairs of analyses other than the multiscale and shape statistics can be used to reach target classification. Furthermore, a plurality of two or more analyses can be performed, each analysis having its strengths complemented by the other(s). These changes and modifications and all obvious variations of the disclosed embodiment are intended to be embraced by the claims to the limits set by law.

What is claimed is:

1. A method for automatic target recognition, said target acquired as part of a radar image, said radar image formed from digitized returns, said digitized returns processed into pixels forming said radar image, each of said pixels having an amplitude, comprising the steps of:

storing said pixels forming said radar image in a memory, pre-processing said pixels forming said radar image to extract a target chip containing said target from said image;

applying a first recognition algorithm to said target chip to identify a first classification of said target extracted from said image;

applying a second recognition algorithm to said target chip to identify a second classification of said target extracted from said image, said second algorithm complementary to said first algorithm;

fusing said first classification and said second classification to generate a target classification identifying said target.

2. A method as described in claim 1 wherein said pre-processing of said image also extracts a shadow cast by said target.

3. A method as described in claim 2 wherein said first algorithm performs a multiscale analysis.

4. A method as described in claim 3 wherein said multiscale analysis is not dependent on segmentation.

5. A method as described in claim 4 wherein said multiscale analysis is not invariant to target scale, target translation and target rotation.

6. A method as described in claim 2 wherein said second algorithm performs a shape statistics analysis.

7. A method as described in claim 6 wherein said said shape statistics analysis is invariant to scale.

8. A method as described in claim 6 wherein said shape statistics analysis is invariant to target translation, rotation and scaling.

9. A method as described in claim 3 wherein said pre-processing comprises the steps of:

computing a mean and a standard deviation of said target chip containing the target using the amplitudes of each pixel part of said target chip;

computing a first threshold equal to said two standard deviations below said mean of said target chip;

setting to zero all pixels within said target chip having said amplitude below said first threshold to create a first thresholded target chip;

computing a second mean and a second standard deviation using amplitude of pixels part of said first thresholded target chip;

computing a second threshold, said second threshold one-half of said second standard deviation above said second mean;

setting to zero all pixels within said first thresholded target chip below said second threshold to generate a second thresholded chip;

subtracting an amplitude of the minimum non-zero value from each column of said second thresholded chip to generate a third thresholded target chip;

performing a binarization of said third thresholded target chip using morphological filtering of holes and single pixel noise to generate a fourth target chip;

performing a Haar transform on said fourth target chip to generate a transformed target chip.

10. A method as described in claim 9 wherein said Haar transform is performed for three levels.

11. A method as described in claim 10 wherein said first algorithm tests said target chip comprising the steps of:

extracting the entropy features of said target from stored coefficient locations;

computing one or more eigenfeatures said eigenfeatures uniquely distinguishing said target;

appending the entropy features and eigenfeatures;

computing distances of said eigenfeatures extracted from said target chip;

thresholding said distances to limits identifying said target.

12. A method as described in claim 11 wherein said second algorithm is adaptive to a new target by accepting a new set of eigenfeatures.

13. An apparatus for automatic target recognition, said target acquired as part of a radar image, said radar image formed from digitized returns, said digitized returns processed into pixels forming said radar image, each of said pixels having an amplitude, comprising:

memory for storage of said pixels forming said radar image;

a processor for pre-processing said pixels forming said radar image to extract a target chip containing said target from said image;

said processor applying a first recognition algorithm to said target chip to identify a first classification of said target extracted from said image;

said processor applying a second recognition algorithm to said target chip to identify a second classification of said target extracted from said image, said second algorithm complementary to said first algorithm;

said processor fusing said first classification and said second classification to generate a target classification identifying said target.

14. An apparatus as described in claim 13 wherein said processor also extracts a shadow cast by said target from said radar image.

15. An apparatus as described in claim 14 wherein said first recognition algorithm performs a multiscale analysis.

16. A method as described in claim 15 wherein said multiscale analysis is not dependent on segmentation.

17. An apparatus as described in claim 16 wherein said multiscale analysis is not invariant to target scale, target translation and target rotation.

18. An apparatus as described in claim 14 wherein said second recognition algorithm performs a shape statistics analysis.

19. An apparatus as described in claim 18 wherein said shape statistics analysis is invariant to scale.

20. An apparatus as described in claim 19 wherein said shape statistics analysis is invariant to target translation, rotation and scaling.

21. An apparatus as described in claim 15 wherein said processor performs the steps of:

computing a mean and a standard deviation of said target chip containing the target using the amplitudes of each pixel part of said target chip;

computing a first threshold equal to said two standard deviations below said mean of said target chip;

setting to zero all pixels within said target chip having said amplitude below said first threshold to create a first thresholded target chip;

computing a second mean and a second standard deviation using amplitude of pixels part of said first thresholded target chip;

computing a second threshold, said second threshold one-half of said second standard deviation above said second mean;

setting to zero all pixels within said first thresholded target chip below said second threshold to generate a second thresholded chip;

subtracting an amplitude of the minimum non-zero value from each column of said second thresholded chip to generate a third thresholded target chip;

performing a binarization of said third thresholded target chip using morphological filtering of holes and single pixel noise to generate a fourth target chip;

performing a Haar transform on said fourth target chip to generate a transformed target chip.

22. An apparatus as described in claim 21 wherein said Haar transform is performed for three levels.

23. An apparatus as described in claim 21 wherein said first algorithm performed by said processor comprises the steps of:

extracting the entropy features of said target from stored coefficient locations;

computing one or more eigenfeatures said eigenfeatures uniquely distinguishing said target;

appending the entropy features and eigenfeatures;

computing distances of said eigenfeatures extracted from said target chip;

thresholding said distances to limits identifying said target.

24. A method as described in claim 21 wherein said second algorithm is adaptive to a new target by accepting a new set of eigenfeatures.

* * * * *